United States Patent Office 3,218,294
Patented Nov. 16, 1965

3,218,294
POLYOLEFINS STABILIZED WITH (A) A NICKEL COMPLEX OF THIOBISPHENOLS AND (B) A BENZOPHENONE
John L. Rodgers, Somerville, and Ralph Arthur Coleman, Middlesex, N.J., assignors to American Cyanamid Company, Stamford, Conn., a corporation of Maine
No Drawing. Filed May 29, 1962, Ser. No. 198,474
5 Claims. (Cl. 260—45.75)

This invention relates to polyolefins stabilized against the deteriorative effects of exposure to weather and UV-radiation. More particularly, it relates to new compositions of matter comprising a polyolefin, a 2-hydroxy-4-alkoxybenzophenone and a nickel complex of a 2,2'-thiobis(p-alkylphenol).

There has not been yet discovered the ideal stabilizer which can at once solve all problems of instability. The problem of stabilizing polyolefins against deterioration is a very complex one, the solution to which very often involves balancing out the desired result against available means. For example, carbon black, a readily available and low cost material, is an effective UV-absorber. It provides a good degree of protection, especially considering its low cost and, of course, renders the stabilized material opaque to visible light. When opacity is tolerable, then carbon black is acceptable. If, however, as in certain uses, e.g., greenhouse coverings and drapings in building construction, opacity cannot be tolerated, then carbon black, in spite of its advantages, cannot be employed.

Various benzophenone compounds are known to be good UV-absorbers. Use of these is more costly. Some are more compatible with polyolefin materials than others, and there is more of a tendency for these compounds to migrate to the surface of the polyolefin material than is found with carbon black. However, the benzophenone UV-absorbers do not render the stabilized material opaque. Their color, from the point of view of clarity of the stabilized polyolefin, is generally good to excellent and this is continually being improved. If a high degree of stabilization is required, use of these compounds is indicated over use of carbon black in spite of their higher cost. It has always been an object, however, to compensate for the higher cost of benzophenone UV-absorbers by providing ones which are more markedly improved over the known carbon black stabilizer. To a point, this object has been partially accomplished in the past. This can be illustrated in terms of the number of hours a stabilized sample remains stable under standard conditions of exposure to UV-radiation. The generally accepted test is to expose a material in a Fade-Ometer and observe the number of hours the sample remains stable under these conditions before reaching the "brittle point."

In the Fade-Ometer, taking polypropylene as an example, an unstabilized sample reaches the "brittle point" in a time well under 100 hours. Until recently, the better of the UV-absorbers were capable of stabilizing polypropylene for about 200 hours in the Fade-Ometer. More recently, new light stabilizers have become available which are capable of providing stability for 400 or even 500 hours under test conditions. While the latter UV-absorbers more closely approach an ideal solution to the problem of instability, they, of course, do not provide a complete solution to the problem. The availability of these UV-absorbers, however, has vastly improved polyolefin for all uses.

Recently, a class of nickel phenolates and phenolphenolates, wherein the phenol moiety is a 2,2'-thiobis(p-alkylphenol), (either one or two moles of phenol being associated with a nickel molecule) were disclosed as providing stability for polyolefins against UV-radiation. These provide a moderate amount of protection: averaging about 400 hours in a polyolefin sample containing 0.25% thereof; and about 700 hours for samples having 0.5%. While usage at higher concentrations provides better stability than lower concentrations, higher concentrations tend to produce a polyolefin having a light green color. Thus, from the point of view of color, the lower concentrations are better, and, from the point of view of stability, the higher concentrations are better.

Even more recently, in co-pending application, Serial No. 158,576, filed December 11, 1961, a new type of stabilizer was disclosed. These are like the aforementioned nickel complexes of 2,2'-thiobis(p-alkylphenol) complexes except that a molecule of an amine is associated with each molecule of the nickel complex. These may be specifically termed "nickel amine complexes of 2,2'-thiobis(p-alkylphenol)." Compared to what was known theretofore, these nickel amine complexes were extremely useful where the primary consideration was length of protection provided by the stabilizer to the polyolefinic material. Polyolefins having about 0.5% of these complexes remain stable against UV-radiation for a period of unprecedented length. At this concentration level, certain nickel amine complexes conferred stability for periods of over 1,000 hours. The stabilized polyolefins, however, exhibited a slightly yellow initial color. When the concentration level of the stabilizer was reduced to 0.25, stability was conferred for periods consistently greater than 550 hours. Here again, the choice of levels to be employed depended on the primary objective. If it was to have the utmost in stability, higher levels, even though imparting an initial color, were indicated. If clarity of the polyolefin was more significant, lower levels were indicated, in spite of the diminished stability of the polyolefin.

In view of this state of the art of stabilizing polyolefins, it was the object of this invention to provide a composition which can be used to stabilize polyolefins where requirements for durability of the stabilizing effect are high and yet clarity of the polyolefin must be obtained. It was a further object of this invention to provide stabilized polyolefin compositions having more nearly than before possible, a combination of high stability and lack of color. Still further, it is an object of this invention to provide a method whereby polyolefin materials could be stabilized to attain the aforementioned objects.

These and other objects are accomplished beyond expectation by the present invention in a simple and effective manner. It was discovered that mixtures of 2-hydroxy-4-alkoxybenzophenones and a nickel complex of 2,2'-thiobis(p-alkylphenol) provide stability to polyolefins for periods greater than 1,200 hours in the Fade-Ometer. Preferred mixtures of this invention are capable of stabilizing polyolefins for periods of 1,500 hours and even longer than 2,500 hours. At the same time, these mixtures advantageously impart little, if any, color when added to the polyolefins. The mixture, which comprises the stabilizers of the present invention, thus provides protection for far longer periods than would be achieved by the use of either component alone. By this invention, a tool for stabilizing polyolefins is made available which does not require sacrifice of important objectives, such as, reasonable cost and retention of clarity in the stabilized product, in order to obtain stabilization of the highest degree. This invention will be better understood by reference to the following description.

The benzophenones which are used in the stabilizers of the present invention are not new. They are represented by the following formula:

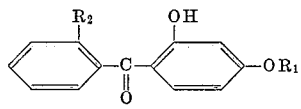

I wherein $R_1$ is an alkyl radical of up to 18 carbon atoms, e.g., methyl, butyl, octyl, dodecyl and octadecyl, and $R_2$ is either hydrogen, methyl, carbomethoxy or carboethoxy. Within Formula I, those benzophenones having an alkoxy group of from 8–12 carbons which are either unsubstituted or have a methyl radical at the "2'-position" are preferred.

The nickel complexes employed in the stabilizers of the present invention are likewise known. They are formed by the reaction of a 2,2'-thiobis(p-alkylphenol) and a nickel salt in an aqueous alcoholic medium. The aquo complex thus formed may contain either one or two moles of the phenol per mole of nickel, and one mole of water is associated therein. These nickel complexes are more fully disclosed in U.S. Patents 2,971,940 and 3,006,886.

By reacting the aforementioned nickel aquo complex with ammonia or an amine in a solvent medium, the associated water molecule is replaced by ammonia or the amine to give the corresponding nickel amine complex. These complexes have ammonia or the amine in a fixed ratio of one mole of either to each mole of nickel. In the case of the complex with ammonia, preparation is effected simply by bubbling ammonia through a solution of, for example, the aquo complex of nickel and a 2,2'-thiobis(p-alkylphenol). In the case of the complex with an amine, the aquo complex may be mixed with the amine in an inert organic solvent such as benzene, chloroform, ether or acetone, and then the solvent removed thereby giving the substantially pure amine complex.

Examples of the 4-alkylphenol sulfides which may be used in preparing the aforementioned complex are: bis(p-octylphenol)sulfide, bis(p-butylphenol)sulfide, bis(p-cyclohexylphenol)sulfide, bis(p-nonylphenol)sulfide, bis(p-ethylphenol)sulfide, bis(p-amylphenol)sulfide, bis(p-t-dodecylphenol)sulfide and bis(p-octadecylphenol)sulfide. Generally stated, the alkyl radical of the phenol sulfide may contain from 1–18 carbon atoms and may be straight chained or cyclic.

Examples of the amines which may be used to form the nickel amine complexes are: ammonia, primary aliphatic amines such as methylamine, ethylamine, propylamine, laurylamine, butylamine, amylamine, octylamine and octadecylamine; primary aromatic amines such as aniline, anisidine, toluidine, 1-naphthylamine, 2-naphthylamine, p-dodecylaniline, p-butylaniline, xylidene and p-octyloxyaniline; and cyclic secondary amines such as morpholine, hexamethyleneimine, piperazine and piperidine.

Within the broad class of nickel complexes described above, those having a molecule of either ammonia or an amine associated therewith are preferred over those having an associated molecule of water or alcohol. Especially preferred nickel amine complexes are: the nickel dodecylamine complex of 2,2'-thiobis(p-t-octylphenol), the nickel butylamine complex of 2,2'-thiobis(p-t-octylphenol) and the nickel ammine complex of 2,2'-thiobis(p-t-octylphenol).

The stabilizer of the present invention may be prepared most simply by mixing the two components in the desired proportions with or without a mutual solvent until a homogenous blend is obtained. The blend may then be incorporated in the polyolefin to be stabilized by milling with the polyolefin to be stabilized. The milled product may be formed by compression-molding into films or sheets, or any other desired shape.

The concentration of the light stabilizer in relation to the polyolefinic material may vary with the intended use of the latter. In general, between 0.05% and 5.0% on the weight of the polyolefinic material will provide adequate protection for most purposes. Within this range, however, a concentration between 0.1% and 3.0% provides the most advantageous effectiveness to cost ratio. As for the relative amounts of the components of the stabilzer on a weight basis, between 1:20 and 20:1 may be employed to give a notable improvement over usage of either component alone. Thus, on this basis, either component may be used in an amount equal to about 0.005 to 4.5% on the weight of the polyolefin. It is preferred, for best results, to use approximately equal amounts of both components rather than a far greater proportion of one to the other. Thus, if the concentration of one component is to be in the lower part of the foregoing range, it is desirable that the other be used likewise in low concentration. Within the framework of these principles, it is relatively simple to determine which proportion should be employed for each individual situation.

It is an advantage of the present invention that the stabilizer thereof can be used to stabilize any polyolefin including polyethylene, polypropylene, polybutylenes, and copolymers of these, such as ethylene-propylene copolymers.

The following examples in which parts and percentages are by weight are presented to show several preferred embodiments of the present invention.

EXAMPLE 1.—PREPARATION OF NICKEL COMPLEXES

Part A

[Nickel amine complex of 2,2'-thiobis(p-t-octylphenol)]

A solution of 11.5 parts of 2,2'-thiobis(4-t-octylphenol) and 7.2 parts of nickel nitrate hexahydrate in 150 parts of ethyl alcohol is treated nearly to the boil and treated, with a solution of 10 parts of 28% aqueous ammonia diluted with 25 parts ethyl alcohol. The precipitate formed is digested at the boil for a short period and then is allowed to cool. The solid is filtered off. The cake is suspended in boiling chloroform and treated with 10 parts of 28% aqueous ammonia, whereupon the nickel complex dissolves completely in the chloroform layer. The chloroform layer is then separated, concentrated and diluted with acetone. The desired product crystallizes and is collected and dried.

Part B

A 1:1 aquo complex, i.e., wherein 1 mole of water is in combination with the nickel complex may be prepared from the thiobis-alkylphenol and nickel nitrate in aqueous alcohol using sodium acetate as an acid binder, by the following procedure:

A solution of 4 parts of 2,2'-thiobis(4-t-octylphenol) and 4 parts $Ni(NO_3)_2 \cdot 6H_2O$ in 100 parts 95% alcohol is treated with 20 parts sodium acetate dissolved in 50 parts 95% alcohol. The solid product is filtered, washed with alcohol and dried.

Aquo complexes of bis(p-nonylphenol)sulfide and bis(p-amylphenol)sulfide are prepared in a similar manner. These are then used to make a variety of amine complexes.

Part C

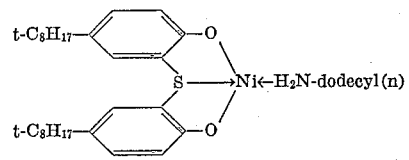

Equimolar quantities of 1:1 aquo complex of the nickel complex 2,2'-thiobis(p-t-octylphenol)sulfide of B and dodecylamine, dissolved in benzene, are evaporated to dryness. The residue is recrystallized from acetone to yield the product.

Part D

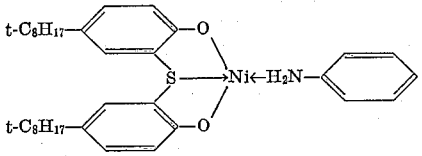

A solution of the 1:1 aquo complex employed in Part C, and a molar excess of aniline in benzene is evaporated to dryness. The residue is dissolved in acetone and evaporated to dryness. The resulting product is dissolved in ether treated with activated alumina, clarified, evaporated to dryness and dried in vacuum for several days.

Part E

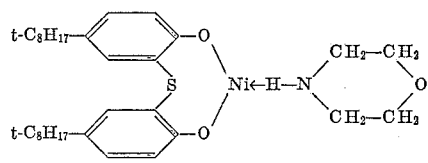

A solution of the 1:1 aquo nickel complex employed in Example 3 and a molar excess of morpholine in acetone is heated at reflux and evaporated to dryness. The product is dissolved in acetone, clarified and evaporated to dryness, and further dried in vacuum for several days.

Part F

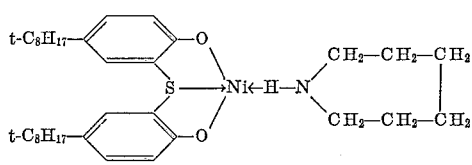

A solution of the aquo complex employed in Part C is dissolved in ether and this is reacted with hexamethyleneimine. The solvent is removed by evaporation, leaving the product as a residue which is dried at reduced pressure at 110° C. to remove the excess amine.

Part G

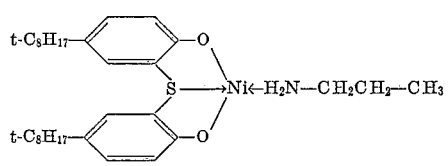

To a solution of 4 g. of 2,2'-thiobis-4-t-octylphenol in 50 ml. of chloroform is added 4 g. (excess) of n-propylamine. Then 20 ml. of aqueous 20% nickel acetate solution (excess) is added and the whole multiphase system is agitated. The chloroform is separated and dried. The chloroform is removed by evaporation, leaving the product as a dry residue.

Part H

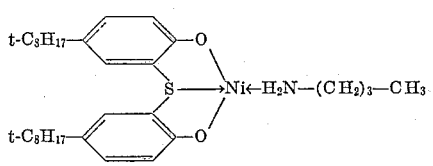

To a solution of 4 g. of 2,2'-thiobis-4-t-octylphenol in 50 ml. of chloroform is added 4.5 g. (excess) of n-butylamine. Then 20 ml. of aqueous 20% nickel acetate solution (excess) is added and the whole multiphase system is agitated. The chloroform is separated and dried. The chloroform is removed by evaporation leaving the product as a dry residue.

Part J

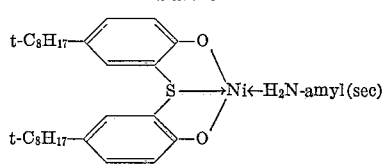

To a solution of 4 g. of 2,2'-thiobis-4-t-octylphenol in 50 ml. of chloroform is added 5.0 g. (excess) of sec-amylamine. Then 20 ml. of aqueous 20% nickel acetate solution (excess) is added and the whole multiphase system is agitated. The chloroform is separated and dried. The chloroform is removed by evaporation leaving the product as a dry residue.

EXAMPLE 2

Effectiveness in polypropylene of various nickel complexes was determined by preparation of polypropylene compositions and exposure to ultraviolet light, the time of exposure before development of brittleness (or induction period for carbonyl formation) being determined. The procedure is described in more detail as follows:

Fifty grams of polypropylene powder were placed in a screw top jar along with the nickel complex to be tested. The blend was tumbled for two hours. This mixture was placed on a 6″ x 13″ mill whose rolls were heated to 360° F. and 320° F., respectively. This blend was passed through the nip of the rolls, stripped from the rolls and fed endwise into the nip to insure maximum mixing. This operation of stripping and passing through the nip was repeated 10 times. From the sheet resulting from this blend, an 18 mil sheet was compression molded. From this molded sheet, specimens were cut out for the Fade-Ometer.

In the following table is shown the degree of protection afforded the polypropylene composition by the stabilizers of Example 1. This is reported as the number of hours of Fade-Ometer exposure before commencement of carbonyl formation, the carbonyl formation indicating breakdown in the composition.

| Run | Compound | Conc. | Fade-Ometer (hours) |
|---|---|---|---|
| 1 | Control | | 10-40 |
| 2 | Product of Example 1A | 0.5 | 1500 |
|   |                       | 0.25 | 850 |
| 3 | Product of Example 1C | 0.5 | 900 |
| 4 | Product of Example 1D | 0.5 | 1100 |
| 5 | Product of Example 1E | 0.5 | 1100 |
| 6 | Product of Example 1F | 0.25 | 550 |
| 7 | Product of Example 1G | 0.25 | 550 |
| 8 | Product of Example 1H | 0.25 | 550 |
| 9 | Product of Example 1J | 0.25 | 550 |

EXAMPLE 3

Into low density polyethylene (DYNH-3) two concentrations of the compound from Example 1A were blended by milling on a 6″ x 13″ two roll mill which was maintained at 285° F. After effecting the mixing as in Example 2, the film samples along with the control were exposed in the Fade-Ometer with the following results:

| | Percent Carbonyl after "x" hours in FOM | | | |
|---|---|---|---|---|
| | 100 | 200 | 300 | 600 |
| Control | .066 | .180 | .357 | |
| 0.25% amine of Example 1A | Nil | Nil | Nil | .009 |
| 0.50% amine of Example 1A | Nil | Nil | Nil | .009 |

EXAMPLE 4

A sample of unstabilized polypropylene was milled by the procedure of Example 2 with 0.25% 2-hydroxy-4-octyloxybenzophenone and an equal weight of the complex of Example 1A. The sample remained stable in the Fade-Ometer for 1950 hours. At the same concentration, but alone, the same benzophenone stabilized polypropylene for 400 hours.

EXAMPLE 5

A sample of unstabilized polypropylene was milled with the additives used in Example 4, but each was used at a concentration level of 0.50% instead of 0.25%. The sample remained stable in the Fade-Ometer for more than 2600 hours. The benzophenone alone, at the 0.50% level stabilized polypropylene for only 700 hours.

EXAMPLE 6

Unstabilized polypropylene was milled as in Example 4 with 0.25% of nickel butylamine complex of 2,2'-thiobis(p-t-octylphenol), i.e., the product of Example 1H, and 0.25% of 2-hydroxy-4-octyloxybenzophenone. The resulting sample was exposed in the Fade-Ometer wherein it remained stable for about 1800 hours.

EXAMPLE 7

Polypropylene was milled with the stabilizers used in Example 6, but at twice the concentration level. The sample remained stable in the Fade-Ometer for 2600 hours.

EXAMPLE 8

Substituting the complex of Example 1C for that of Example 1H, in the procedure of Example 6, a sample of polypropylene was prepared which when exposed in the Fade-Ometer, remained stable for more than 1700 hours.

EXAMPLE 9

The 2:1 nickel complex of 2-thiobis(p-t-octylphenol) and 2-hydroxyl-4-octyloxybenzophenone were milled into polypropylene, using each at a 0.25% concentration. The period of stability in the Fade-Ometer was determined to be far greater than when each of the additives was used alone.

The foregoing examples establish that the combined use of a nickel complex of a thiobis(p-alkylphenol) and a 2-hydroxybenzophenone provides far greater stabilization of polyolefins than either of the additives used alone.

Other combinations may be employed to stabilize polyolefins in accordance with this invention. They include inter alia:

(a) The nickel ammine complex of 2,2'-thiobis(p-octadecylphenol) and 2 - hydroxy - 2' - methyl-4-octadecyloxybenzophenone.
(b) The nickel aniline complex of 2,2' - thiobis(p-dodecylphenol) and 2'-carbomethoxy - 2 - hydroxy-4-dodecyloxybenzophenone, and
(c) The nickel morpholine complex of 2,2'-thiobis(p-t - octylphenol) and 2' - carboethoxy - 2 - hydroxy - 4-heptoxybenzophenone.
(d) The nickel complex of 2,2'-thiobis(p-t-octylphenol) and 2-hydroxy-4-dodecyloxybenzophenone.

We claim:

1. A composition of matter comprising a polymer of a mono-olefin, and a synergistic stabilizing amount of a mixture of
   (a) a nickel complex of 2,2'-thiobis(p-alkylphenol) wherein the alkyl radicals have up to 18 carbons; and
   (b) a compound of the formula:

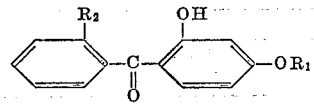

wherein $R_1$ is an alkyl radical of up to 18 carbons, and $R_2$ is a member selected from the group consisting of hydrogen and methyl; the respective concentrations of (a) and (b) in the mixture being such that the number of hours of ultraviolet stability of the stabilizer mixture is greater than the total hours of ultraviolet stability from (a) used individually and (b) used individually in the same respective concentrations.

2. The composition of claim 1 wherein 0.5% to 3.0%, on the weight of the polymer of a mono-olefin, of the stabilizer is employed; and (a) and (b) are present in approximately equal amounts.

3. A composition comprising a polymer of a mono-olefin and a synergistic stabilizing amount of a mixture of:
   (a) a nickel amine complex of 2,2'-thiobis(p-alkylphenol) wherein the alkyl radicals have up to 18 carbons; and
   (b) a compound of the formula:

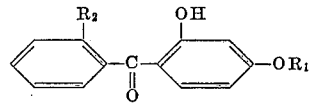

wherein $R_1$ is an alkyl radical of up to 18 carbons, and $R_2$ is a member selected from the group consisting of hydrogen and methyl; the respective concentrations of (a) and (b) in the mixture being such that the number of hours of ultraviolet stability of the stabilizer mixture is greater than the total number of hours of ultraviolet stability from (a) used individually and (b) used individually in the same respective ocncentrations.

4. The composition of claim 3 wherein the nickel amine complex is nickel butylamine-2,2'-thiobis(p-octylphenol).

5. The composition of claim 3 wherein the compound is 2-hydroxy-4-octyloxybenzophenone.

References Cited by the Examiner

UNITED STATES PATENTS

| | | | |
|---|---|---|---|
| 2,630,419 | 3/1953 | Wakefield et al. | 260—44 |
| 2,971,940 | 2/1961 | Fuchsman et al. | 260—45.75 |
| 2,971,941 | 2/1961 | Fuchsman et al. | 260—45.75 |
| 3,006,885 | 10/1961 | Dickson | 260—45.75 |
| 3,006,886 | 10/1961 | Schilling | 260—45.75 |
| 3,086,988 | 4/1963 | Gordon | 260—45.95 |
| 3,098,842 | 7/1963 | Armitage et al. | 260—45.95 |

FOREIGN PATENTS 884,888   12/1961   Great Britain.

OTHER REFERENCES

Neureiter et al.: "Synergism Between Phenols and Sulfides in the Stabilization of Polyolefins to Oxidation," I. & E. C. Product Research and Development, vol. 1, No. 4, December 1962, pp. 236–241.

Perry, N. L.: "Stabilizers," 1963 Modern Plastics Encyclopedia, vol. 40, No. 1A, September 1962, pp. 502–505.

Weichsel, J. A.: "Ultra Violet Absorbers," 1962 Modern Plastics Encyclopedia, vol. 39, 1A, September 1961, pp. 458–63.

LEON J. BERCOVITZ, *Primary Examiner.*